United States Patent [19]

Pitel

[11] Patent Number: 4,687,985
[45] Date of Patent: Aug. 18, 1987

[54] TWO TERMINAL CONTROL SWITCH HAVING A MAIN SWITCH AND A SATURABLE CURRENT TRANSFORMER WHOSE PRIMARY WINDING IS SERIES CONNECTED WITH THE MAIN SWITCH

[75] Inventor: Ira J. Pitel, Morristown, N.J.

[73] Assignee: Tork, Inc., Mt. Vernon, N.Y.

[21] Appl. No.: 4,842

[22] Filed: Jan. 12, 1987

Related U.S. Application Data

[63] Continuation of Ser. No. 791,507, Oct. 25, 1985.

[51] Int. Cl.$^4$ .............................................. G05F 3/04
[52] U.S. Cl. .................................. 323/323; 307/632; 315/360
[58] Field of Search ...................... 323/239, 320–326; 315/272, 273, 292, 360, 199; 307/252 B

[56] References Cited

U.S. PATENT DOCUMENTS

| | | | |
|---|---|---|---|
| 4,276,486 | 6/1981 | Ahuja et al. | 307/252 B |
| 4,334,183 | 6/1982 | Hauenstein | 307/252 B |
| 4,368,419 | 1/1983 | Welty | 323/324 |
| 4,369,377 | 1/1983 | Dytch | 315/360 |
| 4,591,781 | 5/1986 | Larson | 323/323 |

*Primary Examiner*—William H. Beha, Jr.
*Attorney, Agent, or Firm*—John F. Ohlandt

[57] ABSTRACT

A two terminal control switch having a main switch and a saturable current transformer whose primary winding is series connected with the main switch. A center tapped full wave rectifier has a capacitor connected between its DC sides, such capacitor also being connected to a junction between the primary winding and the main switch.

4 Claims, 8 Drawing Figures

FIG.1

CONVENTIONAL

TWO TERMINAL CONTROL SWITCH HAVING A MAIN SWITCH AND A SATURABLE CURRENT TRANSFORMER WHOSE PRIMARY WINDING IS SERIES CONNECTED WITH THE MAIN SWITCH

This is a continuation of application Ser. No. 791,507, filed Oct. 25, 1985.

BACKGROUND OF THE INVENTION

1. Field of the Invention

The present invention pertains to interval timers and, more particularly, to two-wire electronic devices designed to be retrofitted, that is, to be substituted in place of two-wire or two-terminal conventional wall switches.

2. Background Information

In electronic designs that have been proposed heretofore for interval timers adapted for the aforenoted retrofitted application, it is generally desirable to have the timer operable in a simple two-wire configuration. However, this presents a serious problem because the voltage supply for the various components involved in the control circuit must be available while the main switch is conducting.

To obtain the required control circuit voltage for operation of the aforenoted control devices or components, the main, electronic switch is usually turned off for a fraction of a cycle. This allows sufficient voltage to bias the control circuit components.

Referring for the moment to FIG. 1, a conventional interval timer is therein shown. This timer includes a pilot or control thyristor designated TRIAC 2, to drive the main, thyristor switch, TRIAC 1, which directly controls the load.

Although simple in design, the conventional timer of FIG. 1 produces a DC voltage offset at the switch terminals A and B. This can be appreciated by reference to FIG. 2 in which typical wave forms are depicted. The problem that is presented is that if the load is in the form of magnetic devices such as transformers, ballasts, and motors, such devices will be extremely sensitive to such DC voltage offsets. As a consequence, magnetic core saturation and high excitation currents will be produced. Therefore, the method embodied in the conventional timer of FIG. 1 is applicable only to resistive type loads.

SUMMARY OF THE INVENTION

One of the primary objects of the present invention is to enable, in a context of a timing arrangement for a load, the supply of power to a control circuit for a main, solid state, or electronic switch during the entire period that the main switch is conducting.

Another primary object is to avoid the aforenoted DC voltage offset normally encountered at the main switch terminals when a scheme in accordance with a known design is operated. Because a substantially zero DC voltage offset is achieved by the present invention, the timing arrangement is applicable to the control of magnetic loads such as transformers, ballasts, motors, and the like.

A subordinate object is to include a field programmable switch which will allow the user to select the desired time out as part of the interval timer.

Another object is to provide a warning indication to alert the user that time out is about to occur.

Further, a specific object is to provide a very low "parts account" thereby enabling mounting in a single gang wall box.

Yet another object is to provide a low powered set-reset switch so as to insure long mechanical life for the interval timer.

A primary feature of the present invention resides in a scheme which provides substantially zero DC voltage offset at the main switch terminals of an interval timer. This result is specifically achieved by deploying a series-connected current transformer, preferably a saturable transformer, as the means for obtaining control circuit power during the entire conducting period of the main switch. Consequently, control circuit power becomes available on a symmetrical basis during both half cycles of the 120 volt AC source. Accordingly, a symmetrical output voltage waveform is achieved by the timer arrangement of the present invention. Hence the avoidance of DC voltage offset.

In accordance with a more specific feature, one end of the aforenoted saturable current transformer is connected to a first main terminal which controls the load, and the other end of the saturable current transformer is connected to a first electrode of the main, solid state switch, another of the electrodes of said switch being connected to the other main terminal. Another way of stating this is that the current transformer is in series with the anode and cathode of the main switch between the main switch terminals. Such main switch terminals correspond with terminals that in conventional designs were controlled by a standard mechanical toggle switch installed in an electrical box.

Other and further objects, advantages and features of the present invention will be understood by reference to the following specification in conjunction with the annexed drawing, wherein like parts have been given like numbers.

BRIEF DESCRIPTION OF THE DRAWING

FIG. 1 is a schematic diagram of a conventional interval timer already known in the art.

FIGS. 2A and 2B are on-state voltage and current wave forms respectively of the aforesaid conventional interval timer.

DESCRIPTION OF PREFERRED EMBODIMENTS

Figures 1, 2A, 2B:
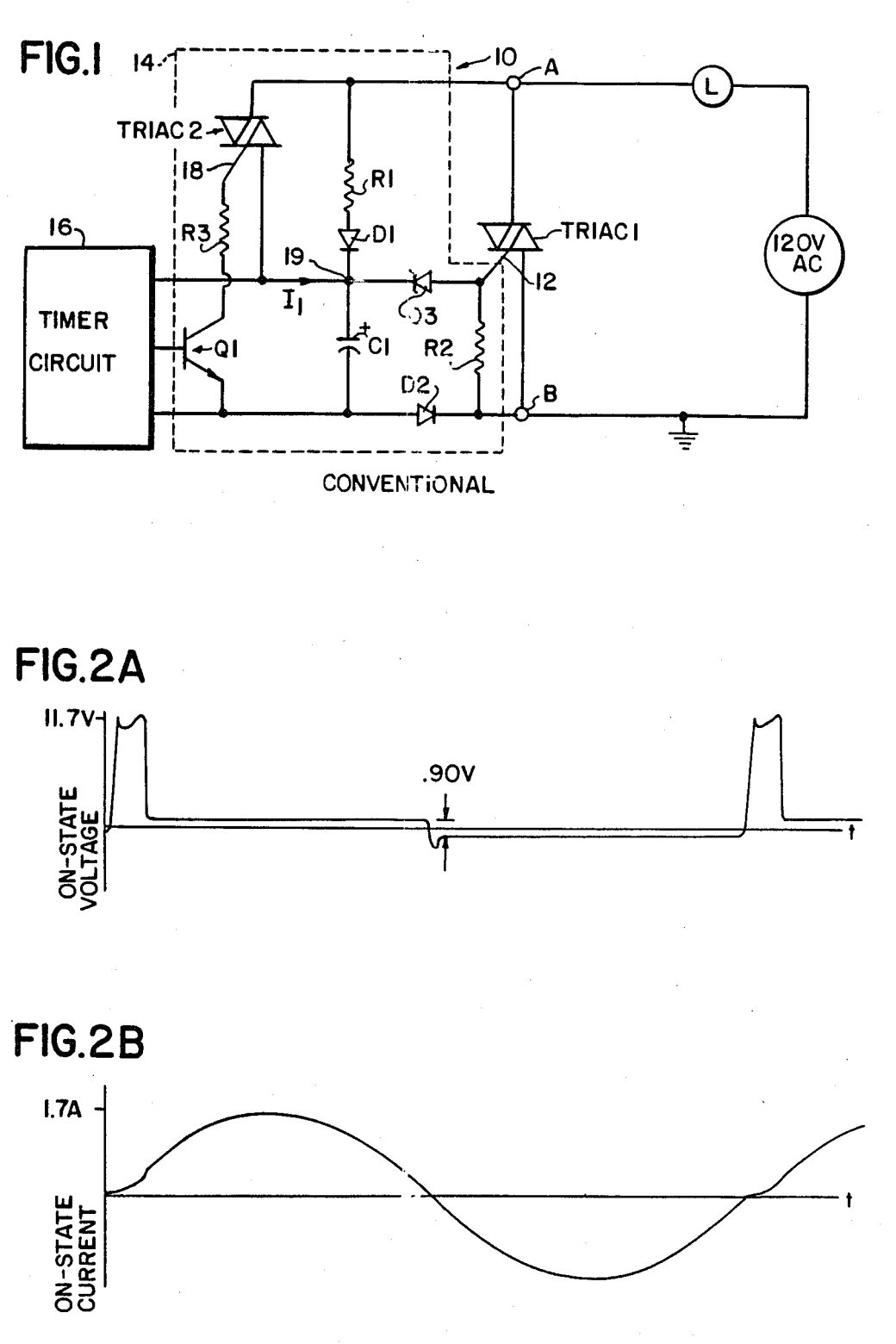
Figure 3:
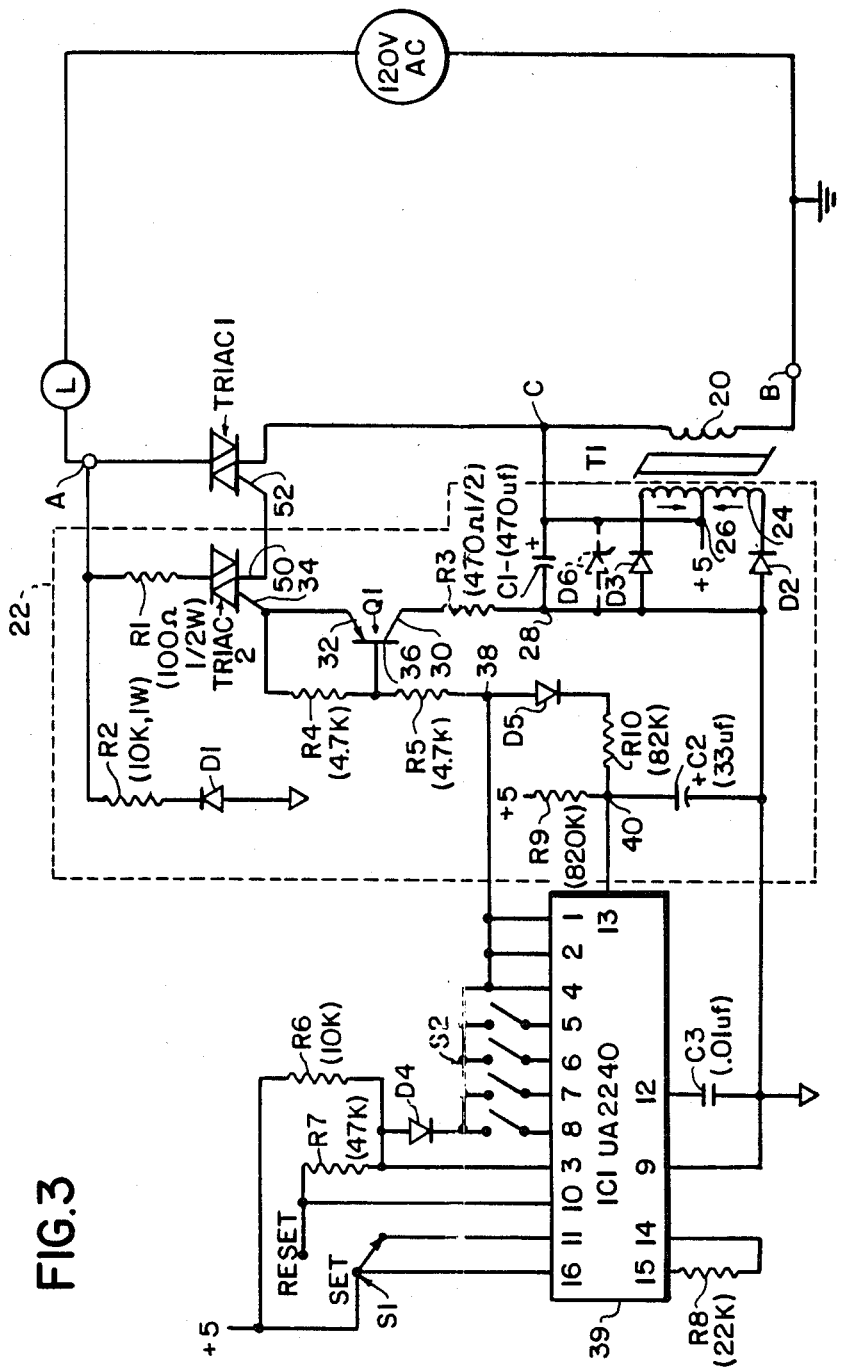
FIG. 3 is a schematic diagram of a first preferred embodiment of an interval timer in accordance with the present invention.

Before proceeding with the description of the preferred embodiments, reference may be made to FIG. 1 in which is shown a schematic diagram of the conventional interval timer already noted. The circuit seen in FIG. 1 includes a source of power designated 120 volt AC and a load designated L. The source is connected to the load by way of the main terminals A and B. In place of a toggle switch or the like, a conventional interval timer 10 is connected, including a main solid state switch in the form of TRIAC 1 connected across the terminals A and B. This TRIAC 1 is equivalent to a bi-directional or two-way silicon control rectifier for purposes well known in the art. The TRIAC 1 is controlled in both directions, that is placed in its output conductive or nonconductive state by means of the voltage present on a gate electrode 12, such gate electrode operating in both bias directions to cause triggering of TRIAC 1 into bistable conductive states in both directions.

The control circuit for the TRIAC 1 is designated 14 and such circuit includes a pilot or control solid state switch in the form of a thyristor designated TRIAC 2 which drives or controls the main switch, TRIAC 1. Connected to the control circuit 14 is a timer circuit 16 which is designed to be set by the user to any selected time interval. A transistor Q1 for control purposes has its base connected to one terminal of the timer control circuit, the emitter thereof being connected to reference potential, and its collector being connected by way of resistor R3 to the gate electrode 18 of the control TRIAC 2. The upper electrode of TRIAC 2 is connected to main terminal A and the other electrode to a junction 19. From this junction a network R1, D1 is connected to terminal A, such network serving to provide ON bias, i.e. to charge capacitor C1 when TRIAC 1 and TRIAC 2 are OFF. It will be noted that a capacitor C1 is connected from junction 19 to reference potential, and that diode D2 is connected from capacitor C1 to terminal B. A resistor R2 is also connected between terminal B and the gate 12 of TRIAC 1. A zener diode D3 is connected between the gate 12 and the junction 19.

On the assumption that the timer circuit 16 has been appropriateley set by the user to "time out" or provide a predetermined timing interval, then the presence of the power source, that is the 120 volt AC, will produce conduction of control TRIAC 2 in the first instance and this in turn will drive or produce conduction of the main switch, that is TRIAC 1. What happens is that during the conducting state TRIAC 2 has continuous drive, thereby causing a current I₁ shown in FIG. 1 to flow through the zener diode D3 and capacitor C1. At the beginning of the positive half cycle of the AC, current I₁ flows through capacitor C1 charging it to the zener or breakdown voltage for the zener diode. After this breakdown point, zener diode D3 conducts causing TRIAC 1 to fire. It will be borne in mind that, as noted previously, both of these TRIACS are bistable devices, and hence continue to conduct even though their respective gate voltages decrease below the point at which firing or conduction of the TRIACS was commenced.

The significant factor in the conduction of TRIAC 1 is that on the negative half cycle the diode D2 is reversed biased; thus, zener diode D3 operates in the forward conducting mode which means that it has only a slight voltage drop across it, on the order of 0.6 volts, but with significant conduction of current therethrough; whereas in the reverse direction, already mentioned, it was necessary to reach a breakdown voltage of approximately 11.7 volts.

The significant difference in result can be understood by referrring to FIG. 2A in which the ON-state of the voltage wave form is depicted. Here it can be seen that in the initial stage the voltage across the TRIAC, that is, across the terminals A and B, rises significantly to approximately 11.7 volts. However, a totally different effect is produced on the negative half wave, since, as seen, only a very slight voltage change is effected. The fact of this asymmetry, that is of the substantial DC voltage offset, results in magnetic core saturation and high excitation currents for any magnetic load placed in the circuit.

Referring now to FIG. 3, the improved timing arrangement in accordance with the first preferred embodiment is illustrated. The same power source, that is 120 AC, is utilized and a load L is to be connected to that power source. However, as has already been emphasized, the load in this case can now be a magnetic device such as fluorescent light ballasts, motors and the like. TRIAC 1 again functions as the main, electronic switching element but is now connected in series with a transformer T1; more precisely in series with the primary winding 20 of that transformer.

Such transformer T1 constitutes an isolated source of power for the control circuit 22 by way of the secondary winding 24 of transformer T1, such secondary being center tapped to provide an approximately +5 volt power source to the various components of the control circuit. The secondary winding 24 is connected at one end to a diode D3 and at the other end to a diode D2 for full wave rectification purposes. The center tap 26 is also optionally connected to a zener diode D6 and also to capacitor C1.

All of the aforesaid elements, that is diodes D2, D3, zener diode D6, and capacitor C1 are connected to a common junction 28. From this junction a collector resistor R3 is connected to the collector 30 of transistor Q1, the emitter 32 thereof being connected to the gate 34 of TRIAC 2. The gate is also connected by way of resistor R4 to the base 36 of transistor Q1, the base also being connected to a network including resistor R5 whose other end is connected to junction 38. Such junction 38 is connected to switch means S2 on a conventional timer element 39, known as ICI, UA2240 manufactured by Fairchild and Texas Instruments. Another terminal of this timer element, that is, terminal 13 is connected to a junction 40 to which resistor R9 is connected at one of its ends, the opposite end of such resistor being connected to the voltage supply. Resistor R10 and capacitor C2 are also connected to junction 40, the other end of resistor R10 being connected to D5. The other end of D5 is connected to junction 38. Capacitor C2 is also connected to reference potential.

Other components that are connected to the timer element 39 are capacitor C3 which is also connected to reference potential, and R8 which is connected between two terminals of timer element 39. Also provided, are: resistor R7, which is connected to a reset terminal of switch means S1, and resistor R6 which is connected to the voltage supply. The other ends of both of these resistors are connected by way of a diode D4 to the switch means S2, as well as to terminal three. Additional elements that are connected to terminal A are the resistor R2 and diode D1 in series, the other end of this series arrangement being connected to reference potential. It should be especially noted that in FIG. 3 TRIAC 2 is shown connected to TRIAC 1, specifically by reason of the fact that the lower electrode 50 of TRIAC 2 is connected to the gate 52 of TRIAC 1. However, this is not the only arrangement that can be utilized. Instead of the two TRIACS only TRIAC 1 could be employed. In this case the transistor Q1 would have its emitter connected directly to the gate 52 of TRIAC 1, resistor R1, and TRIAC 2 being omitted.

Referring now to the timer element 39 in FIG. 3, it will be understood that in the reset position of switch means S1, capacitor C1 is charged through resistor R2 and diode D1 so as to bias the control circuit 22 to approximately 4.5 volts. In this condition transistor Q1, TRIAC 1 and TRIAC 2 are OFF.

By momentarily pressing switch means S1 to the set position shown, pins or terminals 1–8 of the timer element 39 (which can be a unit known as ICIUA2240, manufactured by Fairchild) are forced to a low state. As a consequence, transistor Q1, TRIAC 1 and TRIAC 2 are turned on. It should be noted that TRIAC 2 behaves as a gate amplifier thereby reducing the power requirements of the control circuit. In a typical construction, TRIAC 2 is a unit known as MAC 97-8 manufactured by Motorola. TRIAC 1 is a high power unit known as Q4025L5 manufactured by Tecor.

With TRIAC 1 now in the ON state, control circuit power is obtained from saturable current transformer T1. This magnetic device is designed to saturate at approximately 5 volts, thereby causing rudimentary regulation due to the BH characteristics of its core. It is desirable to operate an interval timer over a wide load current range; therefore, a non-linear magnetic device such as saturable current transformer T1 offers this kind of performance at a minimum size and cost.

Figure 4:
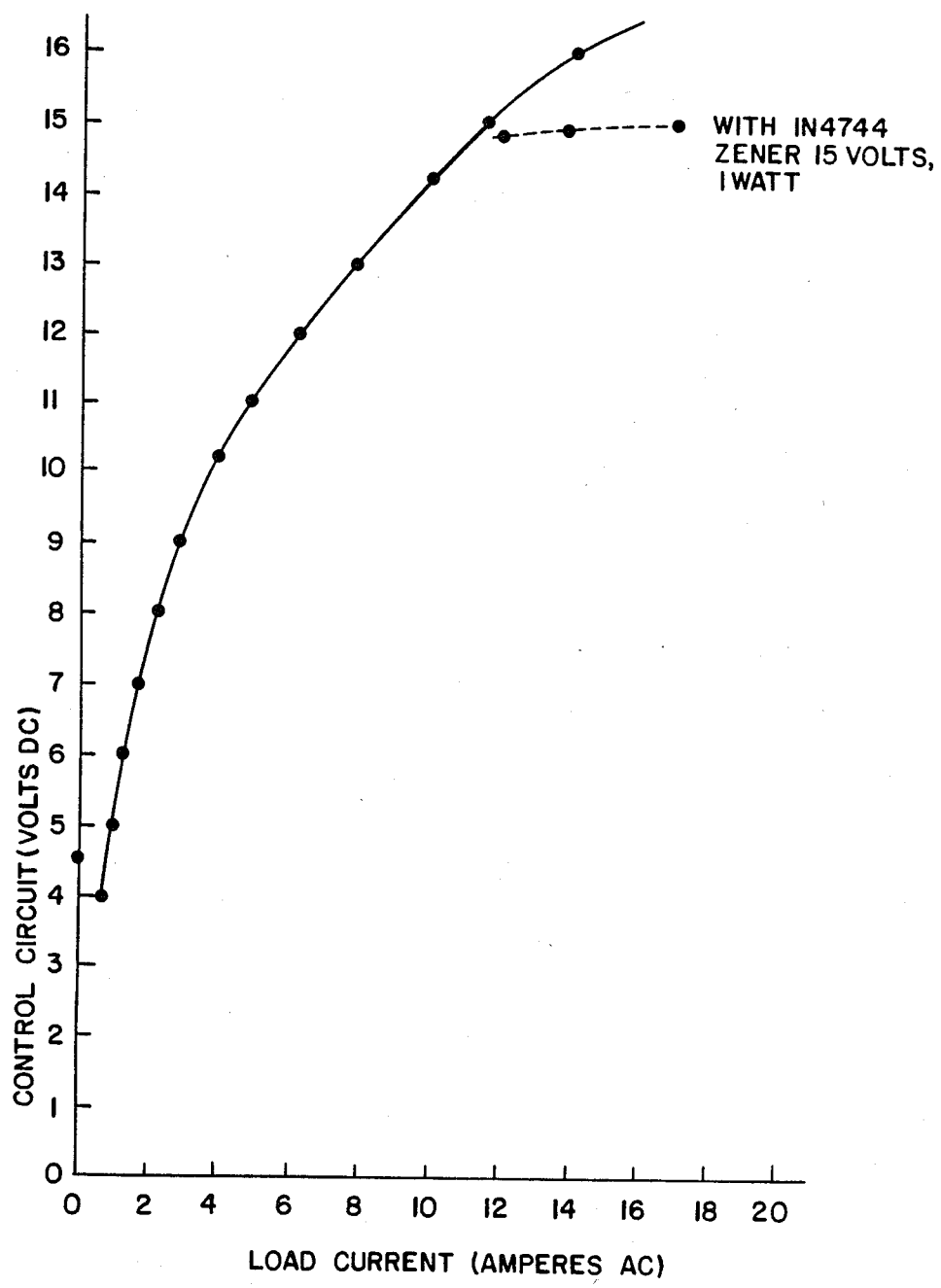
FIG. 4 is a graph of control circuit voltage (volts d.c.) versus load current (amperes a.c.) for the device of the present invention.

FIG. 4 shows curves of control circuit voltage versus load current where the control circuit voltage is in volts DC and the load current is in amperes AC. The dotted portion of the curve indicates regulation with the optional zener diode already noted, that is zener diode D6, being employed. It will be appreciated by those skilled in the art that a 20:1 variation in load current is thus possible with the interval timer of the present invention.

Control circuit power is derived, as already noted, on a symmetrical basis from both half cycles of the line; also transformer T1 is deployed, which blocks any significant DC component. Therefore, any DC voltage offset that can occur would be that due to TRIAC 1. However, such a DC voltage offset would be very small, typically less than 0.1 volts. This is insignificant, even with inductive type loads.

Accordingly, the clear, advantageous result of the arrangement in accordance with the present invention is that substantially zero DC voltage offset is obtained. The typical on-state wave forms between the switch terminals A and B that are obtained with the present invention are depicted in FIG. 5. It should be observed that there is a step from 1.2 volts to 0.87 volts in the voltage wave form. This is the point at which transformer T1 saturates. Selection of higher load currents will cause this transition point to occur earlier in the half cycle.

Figure 5A:
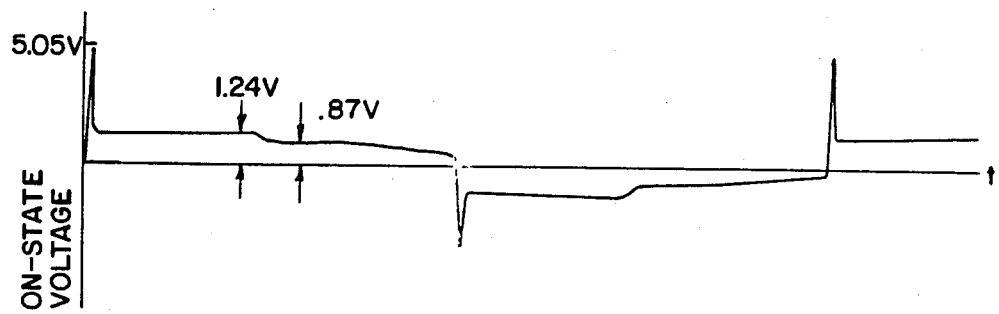
FIGS. 5A and 5B are on-state voltage and current wave forms respectively of the interval timer of the present invention suitable for driving magnetic devices.
Figure 5B:
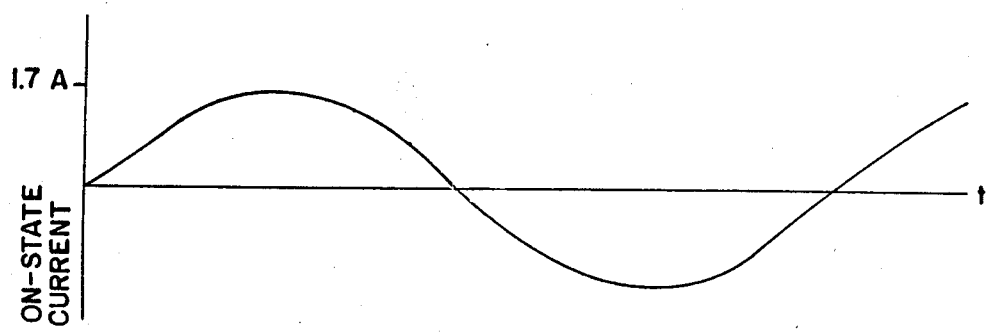

As will be apparent, the substantially zero DC offset that is realized is due to the substantially perfect symmetrical half cycle voltage wave forms as seen in FIG. 5A.

It will be understood by those skilled in the art that with the timer element 39 having its switch means S1 in the set position, pins 1 through 8 switch in a binary manner at a rate determined by resistor R9 and capacitor C2. The timer element, however, resets when pin 10 beomes high. The total time-out period is determined by pins 1–4 and the connected pins 5–8. Assuming a 30 second counting period and that switch S2 is a shorting slide switch, the time-out interval will be defined as seen in Table I.

TABLE I

| Shorting Pins | TIME-OUT INTERVALS | | | | | | | | |
|---|---|---|---|---|---|---|---|---|---|
| | Decimal | Binary | | | | | | | Min. |
| | | 128 | 64 | 32 | 16 | 8 | 4 | 2 | 1 | |
| 5,6,7,8 | 255 | 1 | 1 | 1 | 1 | 1 | 1 | 1 | 1 | 120.0 |
| 5,6,7 | 127 | 0 | 1 | 1 | 1 | 1 | 1 | 1 | 1 | 59.8 |
| 5,6 | 63 | 0 | 0 | 1 | 1 | 1 | 1 | 1 | 1 | 29.7 |
| 5 | 31 | 0 | 0 | 0 | 1 | 1 | 1 | 1 | 1 | 14.6 |
| — | 15 | 0 | 0 | 0 | 0 | 1 | 1 | 1 | 1 | 7.1 |

A blinkout feature (that is, removing power to the load for several seconds) can be incorporated by connection of pin 3 and diode D4. Assuming pins 5 through 8 are shorted and the count is 11111011, transistor Q1 is rendered non-conductive and the load turns off. At this point diode D5 conducts shortening the blink period to several seconds. The blink period is followed by three normal counts completing the time-out interval selected.

Figure 6:
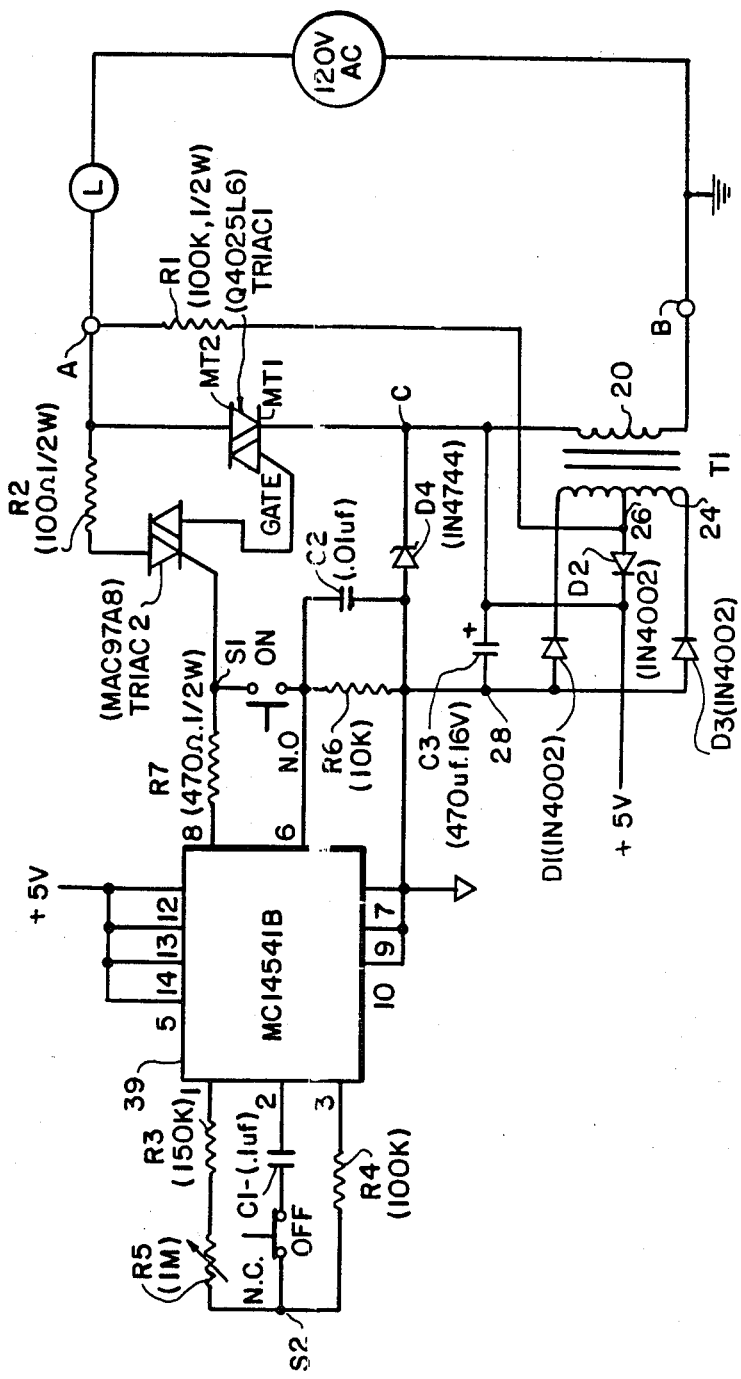
FIG. 6 is an alternate preferred embodiment of the interval timer of the present invention.

An alternate preferred embodiment of the interval timer of the present invention may be appreciated by reference to FIG. 6. Here, the same schematic diagram as previously seen in FIG. 3 is depicted, said schematic arrangement including TRIAC 2 (MAC97A8) as a control device. The primary winding of transformer T1 connected in series with main switch TRIAC 1 (Q4025L5) between the terminals A and C. In this circuit a resistor R1 is shown as connected between terminal A and the center tap 26 at the secondary winding 24 of transformer T1. Also, an additional diode D2 is connected from the center tap 26 to the upper end of the primary winding 20 of transformer T1. A capacitor C3 is connected between the common junction 28 and the upper end of primary winding 20. In this circuit the zener diode is designated D4 and is here connected from the upper end of primary winding 20 to the common junction 28. Otherwise, the control circuit arrangement is as noted before in FIG. 3.

However, the timer element 39 is now a different type, namely a unit knows as MC14541B manufactured by Motorola. Therefore, the network connections, including normally closed switch means S2 and normally open switch means S1, are slightly different from that appearing in FIG. 3.

In this case, closure of switch S1 causes triggering of TRIAC 1 and 2 and simultaneously sets timer IC1. With IC1 set, pin 8 is driven low keeping TRIAC 1 and 2 conducting. The circuit remains in this state for 32,768 counts of an internal oscillator whose frequency is determined by resistors R3 and R5 and capacitor C1.

To render the TRIACS to a non-conducting state prior to the full counting period, switch 2 is opened causing the frequency of the oscillator to increase by several orders of magnitude. This causes the timing period to be completed in a fraction of a second.

Still another preferred embodiment might be to include a mechanical switch in series with the main TRIAC. Here the conduction of the series switch could simultaneously cause setting of timer IC1 (with slight circuit modifications). This enables a mechanical off as may be required by safety regulating authorities.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

I claim:

1. An arrangement for controlling the ON and OFF time intervals for a load comprising:
   a pair of main switch terminals adapted to be closed for connecting an AC power source to a load;
   a first, main, solid state switch connected between said terminals and having conductive and non-conductive states;
   a control circuit controlling said states of said main switch;
   means for obtaining DC control circuit power from said AC power source, said means comprising:
   (1) a full wave rectifier;
   (2) a transformer having a primary winding and a secondary winding, said main switch and the primary winding of said transformer being connected in series;
   (3) said secondary winding including a center tap which constitutes one side of said DC control circuit power, a first junction connected to said center tap, and a second junction defining the other side of said DC power;
   (4) a capacitor, one end which is directly connected to said first junction located between said main switch and said primary winding, the other end of said capacitor being directly connected to said second junction; one end of said rectifier also being directly connected to said second junction, the other end of said rectifier being connected through said secondary winding to said center tap, and a zener diode in shunt with said capacitor.

2. An arrangement as defined in claim 1, in which said transformer is a saturable transformer.

3. An arrangement as defined in claim 1, further comprising a timer circuit for selecting the predetermined time interval during which said main switch will be conductive.

4. An arrangement as defined in claim 3, further comprising a second, control switch, a transistor for controlling the predetermined time interval during which said first main switch will be conductive, said transistor having its input connected to the output of said timer circuit and its output connected to said second, control switch.

* * * * *